United States Patent [19]

Brunelle

[11] 4,449,875
[45] May 22, 1984

[54] SEAT BACK MOUNTING SYSTEM

[75] Inventor: René J. Brunelle, Wolcott, Conn.

[73] Assignee: UOP Inc., Des Plaines, Ill.

[21] Appl. No.: 400,785

[22] Filed: Jul. 22, 1982

[51] Int. Cl.³ .......................... B60P 1/64; B63B 25/24
[52] U.S. Cl. .................................. 410/80; 248/503.1;
410/90; 244/118.5
[58] Field of Search ............... 410/101, 103, 104, 105,
410/102, 90, 91, 52, 77, 80, 84, 74, 75, 130, 132,
150; 248/501, 502, 503, 503.1; 244/118.1, 118.5,
118.6, 122 R; 403/164, 388, 408

[56] References Cited

U.S. PATENT DOCUMENTS

| 4,062,298 | 12/1977 | Weik | 105/482 |
| 4,109,891 | 8/1978 | Grendahl | 248/503.1 |
| 4,213,593 | 1/1980 | Weik | 410/105 X |
| 4,230,432 | 10/1980 | Howell | 410/102 |
| 4,376,522 | 3/1983 | Banks | 248/503.1 |

Primary Examiner—Randolph Reese
Assistant Examiner—Gregory A. Beehner
Attorney, Agent, or Firm—James R. Hoatson, Jr.; Barry L. Clark; William H. Page, II

[57] ABSTRACT

Anti-rattle track fitting for anchoring loads to slotted seat tracks has a vertically movable shear pin at its forward end and a rotationally adjustable threaded stud at its rearward end. The shank of the adjustable stud extends above the fitting and supports a stop collar which prevents excessive loosening of the stud while permitting the stud to be tightened so as to force it into engagement with the lips of the floor track. The shank is hidden from view by being inside the rear leg of a seat but a slot(s) at its upper end is engageable through a small aperture in the rear surface of the leg.

4 Claims, 6 Drawing Figures

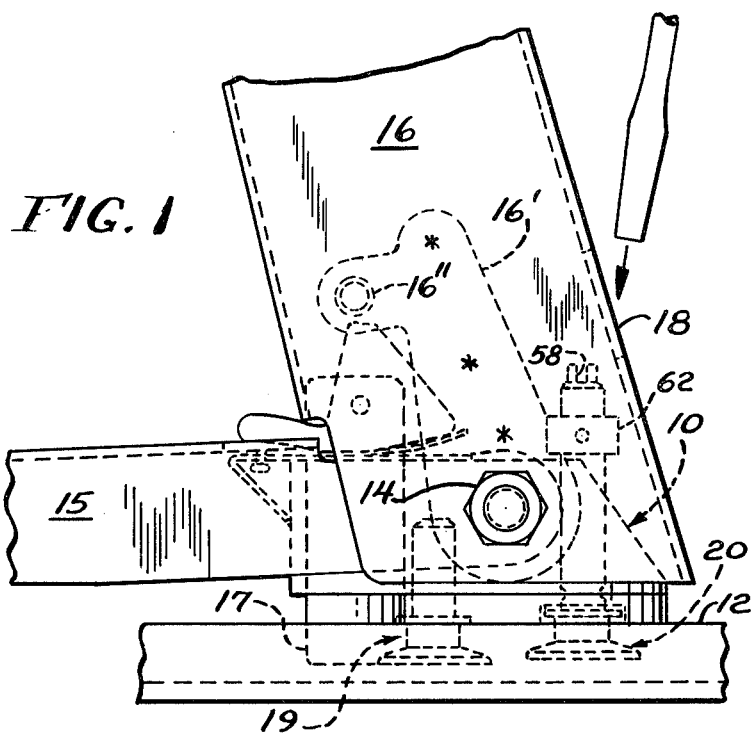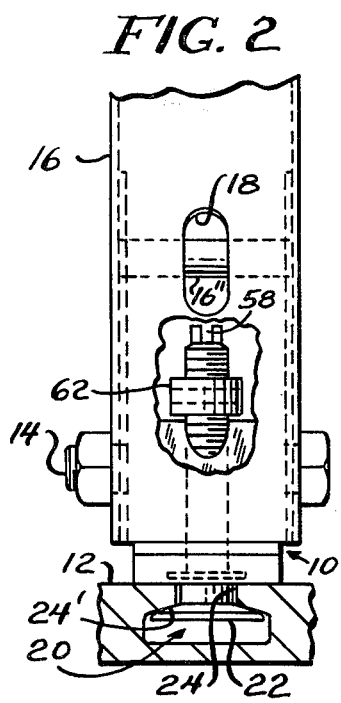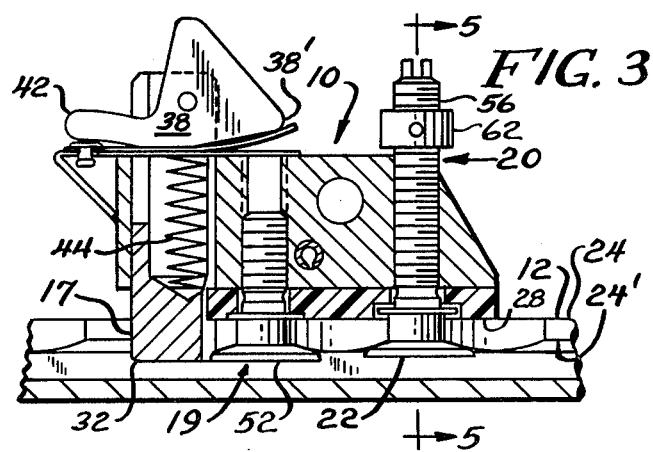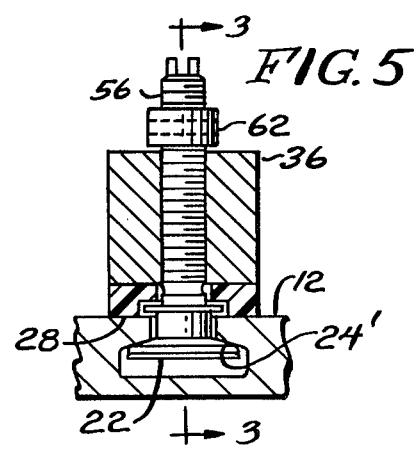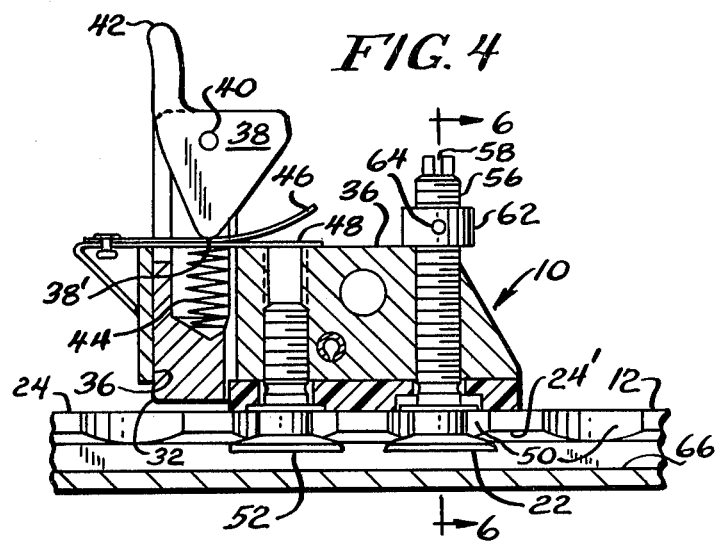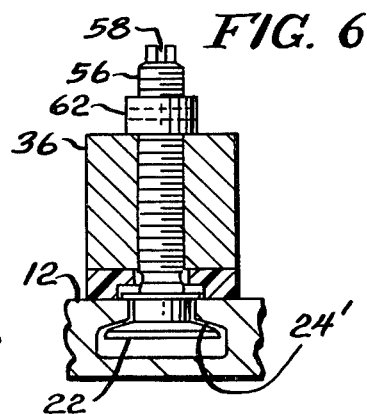

SEAT BACK MOUNTING SYSTEM

BACKGROUND OF THE INVENTION

The invention relates to track fittings for use in anchoring loads to the floor of aircraft. Typically, an aircraft floor includes a plurality of parallel, longitudinally slotted, channel-like tracks arranged flush with the floor down the length of the interior. The tracks have alternate wide and narrow openings which are commonly spaced at a one inch pitch so that fittings for anchoring seats or cargo can be located at any desired multiple inch increment along the length of the track. The fittings and associated track must typically be able to support 4,000 pound vertical and 3,600 pound horizontal loads. One commercially available fitting which meets these requirements comprises a housing which carries a vertically movable shear pin and an operating handle therefor at its forward end and a pair of threaded, headed retaining studs on one inch centers at its rearward end. The headed studs are adapted to be slid under retaining lips in the track and the shear pin is then lowered into the wider openings in the track to prevent forward movement. A transverse aperture is located in the housing midway between the studs for attaching a load to the fitting. The lockable fittings being discussed are usually, when used on a seat, only used on the rear legs of the seat. The front legs are usually attached to the rear legs by a metal strap member and to the seat track by non-lockable fittings. In order to facilitate mounting of the fittings to the floor track, it is customary to provide a small amount of clearance between the interengaging portions of the fitting and the floor track. Unfortunately, the clearance often permits the seat to rattle in the track or be moved slightly by fore or aft forces applied to it by its occupants. The rattling of the fitting can be quite annoying to passengers and the continual movements can result in accelerated wearing of the track and studs.

Various fittings have been proposed to eliminate rattling. Weik U.S. Pat. No. 4,062,298 discloses a relatively lengthy fitting in which the shear pin is moved up and down in a vertical slot in the housing by a pin which is mounted in two pairs of slots and positively advanced by turning a horizontal screw. In the fitting's tightened position, a pad carried by the shear pin presses down on the top of the track as the fitting body is lifted to force the tops of the studs against the bottom of the track lips. Howell U.S. Pat. No. 4,230,432 discloses a shorter fitting where the shear pin is positioned between two fixed studs and is threadedly moved down to engage a track slot and to cause a pad on the shear pin to press down on the top of the track as the fitting body is lifted to force the studs against the bottom of the track lips. Grendahl U.S. Pat. No. 4,109,891 shows a high strength fitting which has four studs on two pivoted plates and an adjustment screw to pivot one plate relative to the other for preventing rattling.

SUMMARY OF THE INVENTION

It is among the objects of the present invention to provide an economically produced aircraft track fitting which can be quickly and easily locked to a floor track to provide positive locking and the elimination of rattling. It is another object to have the locking take place independently of the shear pin. A still further object is to permit existing fittings of the aforementioned commercially available type to be modified rather simply to provide them with an "anti rattle" feature.

These and other objects are attained by the track fitting of the present invention in which the rear stud of an otherwise conventional fitting is replaced by a stud having an elongated threaded shank which extends well above the main body portion of the fitting. The elongated threaded shank has a slot, and preferably crossed slots, at its upper end, by means of which the stud can be rotated and forced upwardly into locking engagement with the undersurface of the lips of the seat track after the fitting is installed. The slot is engageable by a screwdriver which may be inserted through an elongated slot in the rear leg of a seat supported by the fitting. The slot(s) in the stud shank end are preferably recessed inside the seat leg and thus, it would be difficult for a passenger to tamper with them. However, they are extremely conveniently located for access by an authorized seat installer. A stop collar is preferably threaded onto the extended shank and pinned to it at a predetermined location. The stop collar limits the axial distance by which the stud can be moved in a loosening direction and thus prevents it from being moved to an unsafe distance from the floor track lip. Preferably, the stop collar permits the stud to be loosened only to a point where it has the same clearance as the forward fixed stud. Thus, should the installer accidently rotate, and leave the shank in the loosening direction of rotation, the fitting will be as strong as a non-adjustable one. It would, however, still be capable of rattling. Another reason to prevent excessive loosening of the stud is to prevent it from contacting the bottom of the track since electrical wires are sometimes installed in the bottoms of the tracks.

BRIEF DESCRIPTION OF THE DRAWINGS

FIG. 1 is a side view of an installed fitting showing its relationship to a seat leg, a fore and aft tension member, and a floor track;

FIG. 2 is a rear view of the installed fitting of FIG. 1;

FIG. 3 is a side sectional view taken on line 3—3 of FIG. 5 of the fitting and seat track, with the adjustable stud in its tightened position;

FIG. 4 is a view similar to FIG. 3 but showing the fitting being inserted into the seat track;

FIG. 5 is an end sectional view taken on line 5—5 of FIG. 3; and

FIG. 6 is an end sectional view taken on line 6—6 of FIG. 4.

DETAILED DESCRIPTION OF THE DRAWINGS

Referring to FIGS. 1 and 2, the improved track fitting is indicated generally at 10 in its installed position in a slotted floor track 12. The fitting has a bolt assembly 14 passing transversely through it for mounting the fore and aft channel-shaped tension member 15 which attaches the rear leg and fitting to the forward leg and forward track fitting (not shown). The bolt assembly 14 also mounts the fitting to the rear leg member 16, being formed of bent sheet metal, which is channel-shaped and open at its front. A reinforcing plate 16' and a spacer tube 16" permits the leg to achieve maximum strength at a minimum weight. The fitting is locked in the track 12 by shear pin 17. An elongated aperture 18 in the rear of the leg permits access to the fitting for adjustment purposes as hereinafter described. A fixed stud 19 is provided at the forward end of the fitting 10 and a adjustable stud 20 is provided at the rear end. In the installed and tightened position shown, the upper surface of the head 22 of the adjustable stud 20 engages the lower surface 24' of the track lip 24. Thus, the fitting 10 is held firmly in contact with the track 12 and cannot rattle.

FIGS. 3 and 5 illustrate the side and transverse cross-sections of the fitting 10 when it is in operative engagement with a floor track 12. The adjustable stud 20 is shown in its extreme upward position wherein the wide head portion 22 engages the lower surfaces 24' of the retaining lips 24. In this position, a wear plate portion 28, such as a plastic laminate, of the fitting is forced into tight contact with the flat upper surface of the track 12. For clarity, the seat leg 16 and the fore and aft tension member 15 have been omitted. A shear pin 32 is mounted for vertical movement within an aperture 36' in the body 36 of the fitting. A rotatable cam member 38 is pivoted on pin 40 to the top of the shear pin. A handle portion 42 on the cam member permits the cam to be manually rotated from its FIG. 3 position to its FIG. 4 position against the force of internal spring 44. In this latter position, the cam lobe 38' contacts the top of a rattle-preventing leaf spring 46 which is riveted to a welded retaining plate 48, thus lifting the pin 40 and the shear pin 32 to its highest position. In its highest position, the shear pin is spaced above the track member 12 so that it will not interfere during seat installation with the placement of studs 19, 20 into a pair of spaced circular openings 50 formed in the top surface of the track 12. After the studs 19, 20 are dropped into the openings 50, as illustrated in FIGS. 4 and 6, the fitting 10 is moved fore or aft by distance of one-half inch which is equal to one-half of the pitch distance between the openings 50. This movement causes the headed end 22 of adjustable stud 20 and the headed end 52 of the fixed stud 19 to slide under spaced pairs of retaining lips 24' while aligning the shear pin 32 with one of the openings 50. When the fitting is aligned with the desired openings 50, the handle 42 of the cam member is pivoted down to its FIG. 3 position, forcing the shear pin to enter one of the track openings 50, as shown in FIG. 3.

To facilitate placement of a seat and its track fittings into a pair of spaced floor tracks 12, the studs 19, 20 preferably have their heads 52, 22 slightly spaced from the undersurface 24' of the track lips 24. Further clearance is provided between the outside diameter of the shear pin 32 and the openings 50. These clearances are substantially small enough that they do not affect the safety of the connection to the floor track. However, they could permit some vibrational modes of the aircraft to cause rattling of the fittings in the track and possibly some wear between the contacting surfaces. This possibility is prevented by the adjustable stud 20 which has an elongated threaded shank 56 which extends above the fitting body 36 and is threadedly engaged therewith. A pair of crossed slots 58 at the top of the shank 56 are quite accessible to a mechanic's screwdriver through the small aperture 18 in the rear leg 16 and permit the stud to be rotated to its uppermost position shown in FIG. 3 in order to force the headed stud portion 22 to engage the lower surface 24' of the seat track. The slots 58, being effectively hidden from view inside the leg 16 are quite unlikely to be tampered with by passengers. To prevent the possibility that an inadvertent rotation of the shank 56 in a loosening direction could cause the stud head 22 to move to an unsafe clearance spacing from the track surface 24', the shank is provided with a stop collar 62 which may be pinned and threaded to the shank 56 by a pin 64. The stop collar 62 limits the downward shank movement as shown in FIGS. 4 and 6. It also defines a minimum clearance distance between the stud and the bottom wall 66 of the track. This feature would protect the integrity of any wiring that might be located in the bottom of the track.

The improved fitting separates the anti-rattle locking feature from the shear pin actuating portion of the fitting. Thus, the shear pin actuator can be located at the forward end of the fitting where it is highly unlikely to be tampered with by a passenger but is easily snapped into its locked position by a seat installer. The adjustable stud, by being at the rear end of the fitting, is very accessible to an authorized installer who need merely place a screwdriver through the opening 18. However, the shank 56 is preferably recessed inside the leg 16 and ordinarily is not visible through the aperture 18. Thus, it is highly unlikely that a passenger might be tempted to tamper with it.

I claim as my invention:

1. A track fitting assembly for anchoring a load to a slotted floor track in an aircraft or other conveyance, said slotted floor track having lips defining said slot, said assembly comprising an elongated housing having at least two headed studs extending downwardly therefrom and a shear pin movable vertically into and out of engagement with the floor track, one of said headed studs having a helically threaded shank portion in engagement with complementary threads formed in a vertical aperture passing completely through said housing, the upper end of said shank portion extending above said housing and being slotted to permit said one stud to be manually rotated and moved vertically relative to said housing after said studs and shear pin have been placed in operative engaging relationship with a slotted floor track, collar means affixed to said shank portion, said collar means being adapted to engage an upper surface of said housing to limit downward movement of said one headed stud when said shank portion is rotated in a first direction, said collar means being movable vertically upwardly with said shank portion away from said housing when said shank portion is rotated in a second direction, said movement in said second direction causing the upper surface of the headed portion of said one headed stud to contact the undersurface of lip portions of said slotted track and thereby force the housing into firm engagement with said slotted track.

2. A track fitting assembly in accordance with claim 1 wherein said collar mean is threaded and pinned relative to said threaded shank portion.

3. A track fitting assembly in accordance with claim 1 wherein said shear pin is mounted at the forward end of said fitting and said on stud is mounted at the rearward end of said fitting.

4. A track fitting assembly in accordance with claim 3 wherein said load is a seat, said seat having a channel-shaped hollow rear leg formed of bent sheet metal which defines at least the side walls and back wall of the leg, said back wall having an aperture formed therein for providing external access to the slotted upper end portion of said shank portion.

* * * * *